Patented Nov. 1, 1938

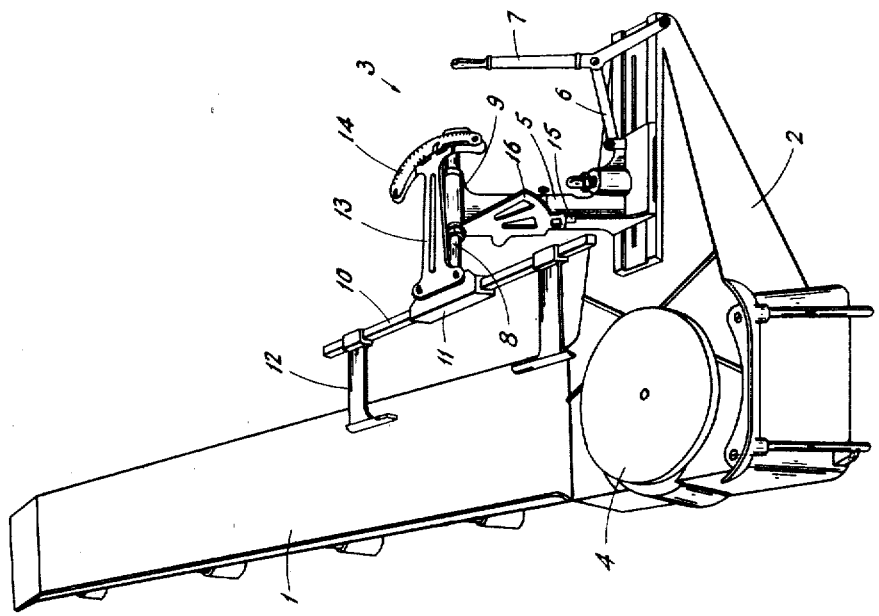
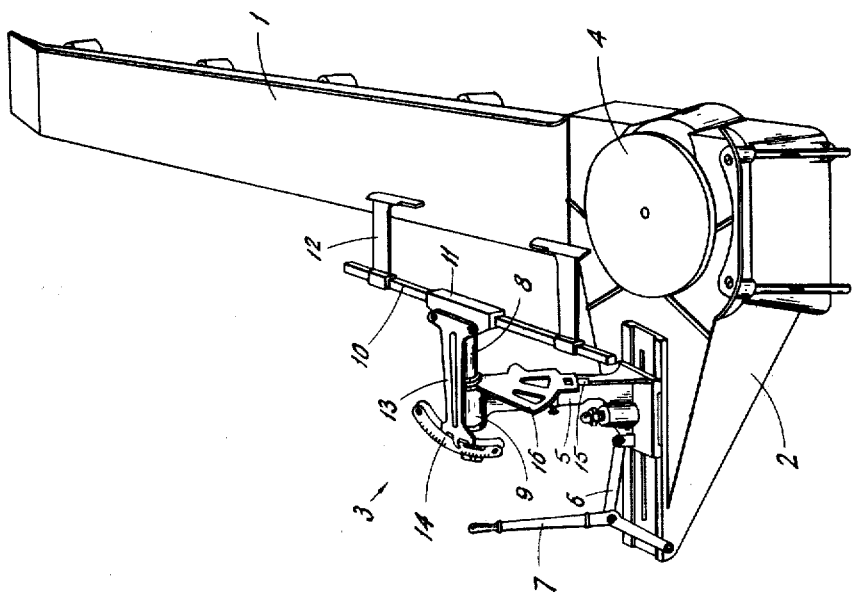

2,135,195

UNITED STATES PATENT OFFICE 2,135,195

TURNTABLE FOR WHEEL ALIGNERS

James W. Morse and Charles S. Phillips, Lansing, Mich., assignors to Food Machinery Corporation, San Jose, Calif., a corporation of Delaware Original application September 17, 1934, Serial No. 744,420. Divided and this application November 2, 1936, Serial No. 108,707

10 Claims. (Cl. 33—203)

The present invention relates generally to apparatus for measuring alignment characteristics of dirigible vehicle wheels, and is more particularly concerned with the provision of an improved type of turntable adapted to be used in connection with such apparatus for supporting the wheels undergoing test, while at the same time permitting free steering movement thereof so that accurate tests may be made with the weight of the vehicle resting on the wheels.

This application is a division of our copending application, Serial No. 744,420, filed September 17, 1934.

In the testing or measuring of certain alignment characteristics of dirigible vehicle wheels, such as caster, king pin inclination, and toe-out, it is necessary to turn the wheels from side to side, as in steering, and it is also highly desirable that the testing be carried out with the weight of the vehicle resting on the wheels, since various factors, such as loose fitting bearings, pins, bushings, and the like, frequently cause the wheels to exhibit false alignment characteristics when they are relieved from the weight of the vehicle, as when they are jacked up. Consequently, measurements of alignment characteristics taken with the weight of the vehicle off the wheels, may be quite different from the true alignment characteristics assumed under actual operating conditions of the vehicle, and therefore be entirely worthless for all practical purposes.

It has heretofore been proposed to employ suitable turntables for supporting the vehicle wheels during the testing operations, so as to facilitate steering movement of the wheels, but it has been found that conventional turntables, such as have rotary movement only, are unsatisfactory in practice, due to the fact that the alignment characteristics of the vehicle wheels, cause them to shift forwardly and backwardly, as well as sideways, when they are turned, as in steering. This introduces a strain or binding in the steering mechanism, which affects the measurements so as to make them inaccurate.

The present invention effectively overcomes these difficulties by the provision of a turntable mounted for free universal lateral movement in addition to the conventional rotary movement, and mechanism is also provided to make the turntable self-centering, so that it will automatically return to its central, or neutral position, after any displacement therefrom. Such construction permits free steering movement of a vehicle wheel supported thereon, and eliminates any possible strain or binding in the steering mechanism during testing, so that accuracy of the testing measurements is not interfered with. Also, it permits the repositioning of the wheels incident to alteration of the alignment characteristics, without any binding of the parts, so that such alterations may be made without lifting the wheels from the turntables and without interfering with the accuracy of reading taken during the alterations, so that the degree of correction can be accurately gauged during alteration.

It is the general object of the invention to provide an improved self-centering turntable for use in connection with wheel alignment measuring apparatus for supporting a dirigible wheel being tested, while permitting free steering movement thereof.

Another object is to provide a turntable of this character, mounted on anti-friction bearings and provided with individual centering means for the turntable and bearing assemblies.

Other and more specific objects will become more apparent as the description proceeds in connection with the accompanying drawings, wherein:

Fig. 1 is a front perspective view of a wheel aligner having our improved turntables associated therewith.

Figure 2:
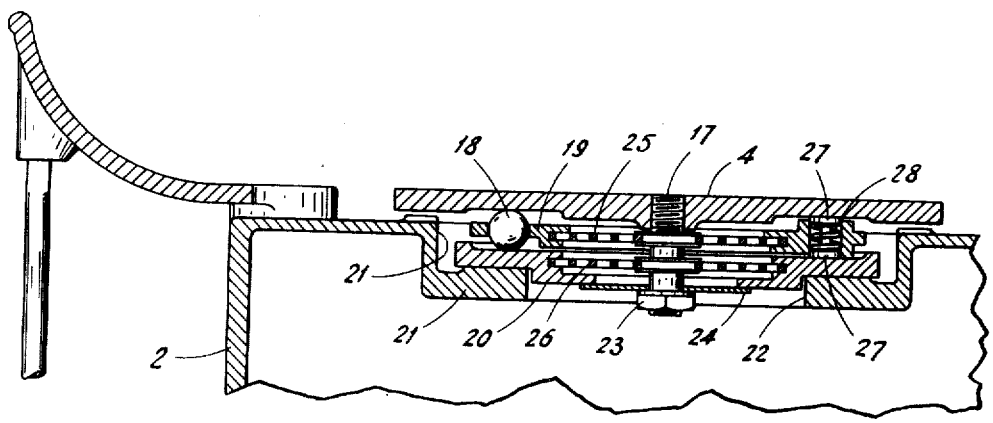
Fig. 2 is a sectional elevation through one of the turntables taken along the line 2—2 of Fig. 3.

Referring first to Fig. 1, the apparatus illustrated comprises a pair of spaced tracks or runways 1, on to which the vehicle to be tested may be driven, and leading up to a pair of base members 2, on which are mounted the alignment measuring devices generally indicated at 3, and the associated turntables 4, which serve to receive and support the front wheels of the vehicle during the testing operations.

The alignment measuring devices 3 are fully disclosed in our co-pending application above referred to, and as they form no part of the present invention, except insofar as they, or similar devices, may be associated therewith, a general description only of their construction and mode of operation will suffice for purposes of this disclosure, reference being had to said co-pending application for further and more specific details with which the present invention is not concerned.

The two alignment measuring devices 3 are of similar construction and each comprises an upright standard 5 slidably mounted on a suitable guideway formed on the upper surface of the base member 2, and carrying the testing mechanism which is adapted to be manipulated for measuring the alignment characteristics of the vehicle wheels driven on the turntables 4. The standards 5 are connected by links 6 to pivoted hand levers 7 by which the devices 3 may be moved up to and away from the wheels to be tested.

A horizontal shaft 8, rotatably journalled in a bearing 9 formed on the upper end of each standard 5, carries a test bar 10 which is slidably journalled in a bearing bracket 11 pivoted to the inner end of the shaft 8. The test bar 10 may have contact shoes 12 slidably mounted thereon for engagement with the tire of the wheel to be tested, so that when the device 3 is moved up to the wheel to bring the shoes into engagement therewith, the test bar 10 is thereby positioned parallel to the plane of the wheel.

An indicating pointer 13 secured to the bearing bracket 11 extends rearwardly therefrom for cooperation with an arcuate scale 14 supported on the outer end of the shaft 8 for rotation therewith. The scale 14 may carry different sets of graduations cooperating with the pointer and calibrated to indicate degrees of camber, caster, toe-in and toe-out. A second and stationary pointer 15 fixed to the standard 5 cooperates with a king pin inclination indicating scale (not shown) on the rear face of a quadrant 16 carried by the shaft 8 for rotation therewith.

With the above described construction, it will be observed that the test bar 10 is mounted for universal movement by reason of the pivotal attachment of the bearing bracket 11 to the rotatable shaft 8, so that the test bar can be turned from horizontal to upright position, or vice versa, and can also be angled into parallel relation with the plane of a wheel to be tested in either of these positions, or positions intermediate thereof. Thus the inclination assumed by the wheel in various selected steering positions may be gauged to determine its alignment characteristics. The particular details of manipulation by which this is accomplished are fully disclosed in our co-pending application referred to, and as they are not required to afford a full understanding of the present invention, it is deemed unnecessary to describe them further herein.

Figure 3:
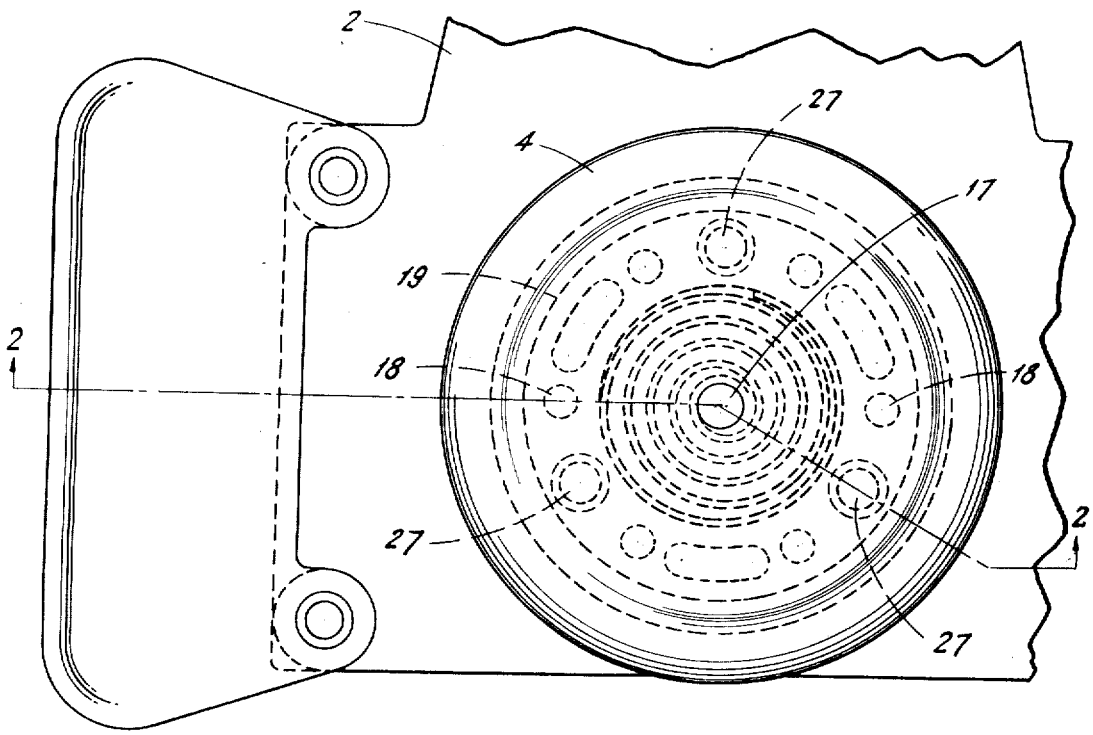
Fig. 3 is a plan view of one of the turntables.

As best seen in Figs. 2 and 3, the turntables 4 are provided with pivot pins 17 and rest on ball bearings 18 carried by a ball retaining cage 19, the balls being in turn supported by a circular bearing plate 20 upon the surface of which they roll. The bearing plate 20 is supported in a recess 21 formed in the upper surface of the base 2 by means of a depressed seat 21 formed integral with the base, and an annular boss on the under surface of the bearing plate 20 fits within an opening 22 in the seat 21 to position the plate centrally of the recess 21. A nut 23 and washer 24 carried on the lower end of the pivot pin 17 serves to hold the parts of the turntable assembly together while permitting relative movement thereof.

A flat spiral spring 25 surrounds the pivot pin 17 and its inner end engages therewith, while its outer end finds engagement in the ball retaining cage 19, so that this spring tends to hold the ball retaining cage in concentric position with respect to the pivot pin. A second flat spiral spring 26 has its inner end in engagement with the pivot pin 17, and its outer end engaging with the bearing plate 20, so as to normally hold the turntable in centralized position over the recess 21.

In order to prevent the turntable from moving too freely, a damping effect may be provided if desired by means of small friction discs 27 mounted in the ball retaining cage 19 and bearing against the under side of the turntable 4 and the top face of the bearing plate 20 against which they are urged by means of small coil springs 28. Several sets of these friction discs may be employed if desired, three of these being illustrated in Fig. 3 so as to give a balanced damping effect.

With the construction described, it will be seen that the turntable is free to rotate as well as to shift laterally in any direction in which it may be urged, but the springs 25 and 26 automatically bring the turntable and its associated bearings back to central position when it is released. Thus, the turntable is free from both rotary and universal lateral shifting movements under the twisting and shifting action of a wheel supported thereon, as the wheel is turned from side to side during the testing operations, and thereby accommodates the repositioning of the wheel so as to relieve any binding action which might otherwise take place in the steering mechanism or wheel mountings, at the same time, the turntable is self-centering when the wheel is removed so as to be in proper position for reuse.

While we have illustrated and described the turntables embodying our invention as they may be used in connection with the alignment measuring devices of our co-pending application referred to, it will be apparent that their use is not confined thereto, but they may be used with other types of wheel alignment measuring devices, as well. It will also be understood that various changes and modifications may be made in the particular turntable construction illustrated without departing from the spirit of our invention, and we deem ourselves entitled to all such uses, changes, and modifications as fall within the scope of the claims hereto appended.

Having now described our invention and in what manner the same may be used, what we claim as new and desire to protect by Letters Patent is:

1. An apparatus for checking the alignment characteristics of automobile wheels comprising a support for an automobile wheel, a turntable mounted on said support for universal lateral movement, a ball bearing under said turntable, a flat plate supporting said ball bearing and permitting universal lateral as well as circumferential movement and an involute spiral spring mounted concentrically beneath said turntable and cooperable therewith for holding said turntable normally central relative to its support.

2. An apparatus for checking the alignment characteristics of automobile wheels comprising a support for an automobile wheel, a turntable on said support, a ball bearing under said table, a supporting plate for said bearing permitting universal movement of said table, an involute spiral spring for normally holding said turntable central relative to its support and frictional retarding means associated with said turntable to prevent a too free movement thereof.

3. In an apparatus for checking the alignment characteristics of a dirigible wheel, a base member, a turntable arranged to support the wheel under treatment, universal journal means for operatively mounting the turntable upon the base member in such manner as to provide for the rotation of the turntable as well as for universal lateral movement thereof, and an involute spiral spring for restraining lateral movement of the turntable from a predetermined normal position relative to said base member.

4. A turntable assembly for wheel aligning machines comprising a turntable provided with a depending centering hub, a base plate beneath said turntable, yieldable restraining means interposed between said base plate and centering hub, an antifriction bearing assembly disposed between said turntable and base plate and a second yieldable restraining means interposed between said bearing assembly and centering hub.

5. A turntable assembly for wheel aligning machines comprising a turntable provided with a depending centering hub, a base plate beneath said turntable, yieldable restraining means interposed between said base plate and centering hub, an anti-friction bearing assembly disposed between said turntable and base plate, frictional retaining means associated with said turntable, and a second yieldable restraining means interposed between said bearing assembly and said centering hub.

6. In an apparatus for checking the alignment characteristics of a dirigible wheel, a support, a wheel supporting turntable, universal journal means mounting said turntable on said support for rotation and for universal lateral movement thereof, yieldable means for restraining lateral movement of said turntable from a predetermined normal position relative to said support, and other yieldable means for controlling relative lateral movement between said journal means and said turntable.

7. In an apparatus for checking the alignment characteristics of a dirigible wheel, a support, a wheel supporting turntable, universal journal means mounting said turntable on said support for rotation and for universal lateral movement thereof, yieldable means for restraining lateral movement of said turntable from a predetermined normal position relative to said support, and frictional retarding means interposed between said turntable and said support.

8. In an apparatus for checking the alignment characteristics of automobile wheels comprising a support, a turntable mounted on said support for rotative and limited universal lateral movement relative thereto, and frictional retarding means interposed between said turntable and said support.

9. A turntable assembly for wheel aligning machines comprising a turntable, a base, a ball bearing mounting supporting said turntable on the base for both rotative and universal lateral movement, an involute spiral centering spring operatively associated with said turntable and bearing mounting for yieldably holding them in centralized relation, and a second involute spiral centering spring operatively associated with the turntable and said base for yieldably holding the turntable in a predetermined normal position relative to the base.

10. A turntable assembly for wheel aligning machines comprising a turntable having a depending hub, a bearing plate beneath said turntable, a ball bearing mounting interposed between the turntable and bearing plate to support the turntable for both rotative and universal lateral movement, a pair of involute spiral centering springs surrounding said hub, one of said springs being interposed between the hub and the bearing plate, and the other being interposed between the hub and the ball bearing mounting.

JAMES W. MORSE.
CHARLES S. PHILLIPS.

CERTIFICATE OF CORRECTION.

Patent No. 2,135,195. November 1, 1938.

JAMES W. MORSE, ET AL.

It is hereby certified that error appears in the printed specification of the above numbered patent requiring correction as follows: Page 2, second column, line 75, claim 3, after "spring" insert the words mounted concentrically beneath said turntable and cooperable therewith; and that the said Letters Patent should be read with this correction therein that the same may conform to the record of the case in the Patent Office.

Signed and sealed this 14th day of February, A.D. 1939.

Henry Van Arsdale.

(Seal) Acting Commissioner of Patents.

turntable from a predetermined normal position relative to said base member.

4. A turntable assembly for wheel aligning machines comprising a turntable provided with a depending centering hub, a base plate beneath said turntable, yieldable restraining means interposed between said base plate and centering hub, an antifriction bearing assembly disposed between said turntable and base plate and a second yieldable restraining means interposed between said bearing assembly and centering hub.

5. A turntable assembly for wheel aligning machines comprising a turntable provided with a depending centering hub, a base plate beneath said turntable, yieldable restraining means interposed between said base plate and centering hub, an anti-friction bearing assembly disposed between said turntable and base plate, frictional retaining means associated with said turntable, and a second yieldable restraining means interposed between said bearing assembly and said centering hub.

6. In an apparatus for checking the alignment characteristics of a dirigible wheel, a support, a wheel supporting turntable, universal journal means mounting said turntable on said support for rotation and for universal lateral movement thereof, yieldable means for restraining lateral movement of said turntable from a predetermined normal position relative to said support, and other yieldable means for controlling relative lateral movement between said journal means and said turntable.

7. In an apparatus for checking the alignment characteristics of a dirigible wheel, a support, a wheel supporting turntable, universal journal means mounting said turntable on said support for rotation and for universal lateral movement thereof, yieldable means for restraining lateral movement of said turntable from a predetermined normal position relative to said support, and frictional retarding means interposed between said turntable and said support.

8. In an apparatus for checking the alignment characteristics of automobile wheels comprising a support, a turntable mounted on said support for rotative and limited universal lateral movement relative thereto, and frictional retarding means interposed between said turntable and said support.

9. A turntable assembly for wheel aligning machines comprising a turntable, a base, a ball bearing mounting supporting said turntable on the base for both rotative and universal lateral movement, an involute spiral centering spring operatively associated with said turntable and bearing mounting for yieldably holding them in centralized relation, and a second involute spiral centering spring operatively associated with the turntable and said base for yieldably holding the turntable in a predetermined normal position relative to the base.

10. A turntable assembly for wheel aligning machines comprising a turntable having a depending hub, a bearing plate beneath said turntable, a ball bearing mounting interposed between the turntable and bearing plate to support the turntable for both rotative and universal lateral movement, a pair of involute spiral centering springs surrounding said hub, one of said springs being interposed between the hub and the bearing plate, and the other being interposed between the hub and the ball bearing mounting.

JAMES W. MORSE.
CHARLES S. PHILLIPS.

CERTIFICATE OF CORRECTION.

Patent No. 2,135,195. November 1, 1938.

JAMES W. MORSE, ET AL.

It is hereby certified that error appears in the printed specification of the above numbered patent requiring correction as follows: Page 2, second column, line 75, claim 3, after "spring" insert the words mounted concentrically beneath said turntable and cooperable therewith; and that the said Letters Patent should be read with this correction therein that the same may conform to the record of the case in the Patent Office.

Signed and sealed this 14th day of February, A.D. 1939.

Henry Van Arsdale.

(Seal) Acting Commissioner of Patents.